United States Patent
Matsubara (10) Patent No.: US 8,030,903 B2
(45) Date of Patent: Oct. 4, 2011

(54) POWER GENERATOR AND ELECTRONIC APPARATUS

(75) Inventor: Naoteru Matsubara, Ichinomiya (JP)

(73) Assignee: Sanyo Electric Co., Ltd., Osaka (JP)

( * ) Notice: Subject to any disclaimer, the term of this patent is extended or adjusted under 35 U.S.C. 154(b) by 562 days.

(21) Appl. No.: 12/239,176

(22) Filed: Sep. 26, 2008

(65) Prior Publication Data

US 2009/0085530 A1    Apr. 2, 2009

(30) Foreign Application Priority Data

Sep. 27, 2007  (JP) .................................. 2007-250459

(51) Int. Cl.
*F03G 7/08* (2006.01)
*H02J 7/00* (2006.01)

(52) U.S. Cl. ....................................................... 320/166

(58) Field of Classification Search .................. 320/104, 320/166; 310/17
See application file for complete search history.

(56) References Cited

U.S. PATENT DOCUMENTS

2008/0296984 A1* 12/2008 Honma et al. .................. 310/17

FOREIGN PATENT DOCUMENTS

JP          2002-084726 A      3/2002

* cited by examiner

*Primary Examiner* — Vincent Q Nguyen
(74) *Attorney, Agent, or Firm* — Ditthavong Mori & Steiner, P.C.

(57) ABSTRACT

A power generator capable of improving power generation efficiency is obtained. This power generator includes a movable portion moving by kinetic energy acting on a power generator body, a first conversion portion converting kinetic energy of the movable portion to electric energy and a movement direction changing portion changing a direction in which the movable portion moves to a direction along a direction in which acceleration applied to the movable portion is larger regardless of a direction of the power generator body.

16 Claims, 9 Drawing Sheets

IN LOW-SPEED RUNNING

DIRECTION OF
GRAVITATIONAL FORCE

FIG.16

IN HIGH-SPEED RUNNING

DIRECTION OF CENTRIFUGAL FORCE

POWER GENERATOR AND ELECTRONIC APPARATUS

CROSS-REFERENCE TO RELATED APPLICATIONS

The priority application number JP2007-250459, Power Generator and Electronic Apparatus, Sep. 27, 2007, Naoteru Matsubara, upon which this patent application is based is hereby incorporated by reference.

BACKGROUND OF THE INVENTION

1. Field of the Invention

The present invention relates to a power generator and an electronic apparatus, and more particularly, it relates to a power generator and an electronic apparatus each comprising converting means converting kinetic energy into electric energy.

2. Description of the Background Art

An electronic apparatus comprising converting means converting kinetic energy into electric energy is known in general.

A conventional electronic apparatus comprises a rotating weight (movable portion) rotating by kinetic energy of a body of the electronic apparatus, a spiral spring storing kinetic energy of the rotating weight as mechanical energy and a power generator including converting means converting mechanical energy of the spiral spring into electric energy. In this electronic apparatus, the rotating weight is rotated by acceleration applied to the electronic apparatus when a user carries or uses the electronic apparatus. Power can be generated by the kinetic energy resulting from the rotation of the rotating weight, and hence the electronic apparatus can be driven without using an energy source from outside such as a battery.

SUMMARY OF THE INVENTION

A power generator according to a first aspect of the present invention comprises a movable portion moving by kinetic energy acting on a power generator body, a first conversion portion converting kinetic energy of the movable portion to electric energy and a movement direction changing portion changing a direction in which the movable portion moves to a direction along a direction in which acceleration applied to the movable portion is larger regardless of a direction of the power generator body.

An electronic apparatus according to a second aspect of the present invention comprises a power generator including a movable portion moving by kinetic energy acting on a power generator body, a first conversion portion converting kinetic energy of the movable portion to electric energy and a movement direction changing portion changing a direction in which the movable portion moves to a direction along a direction in which acceleration applied to the movable portion is larger regardless of a direction of the power generator body.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be hereinafter described with reference to the drawings.

First Embodiment

Figure 1:
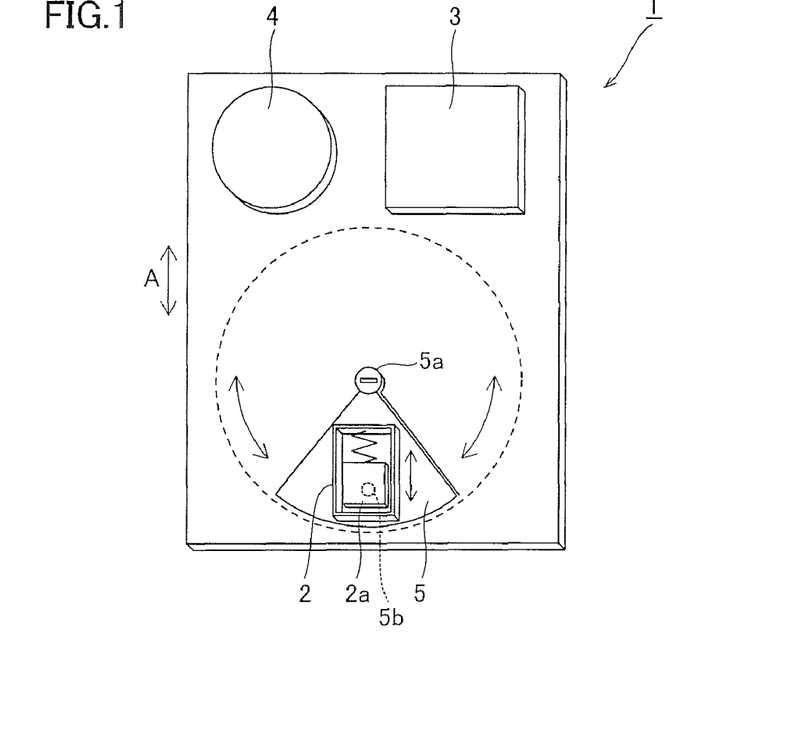
FIG. 1 is a plan view showing a power generator according to a first embodiment of the present invention.
Figure 2:
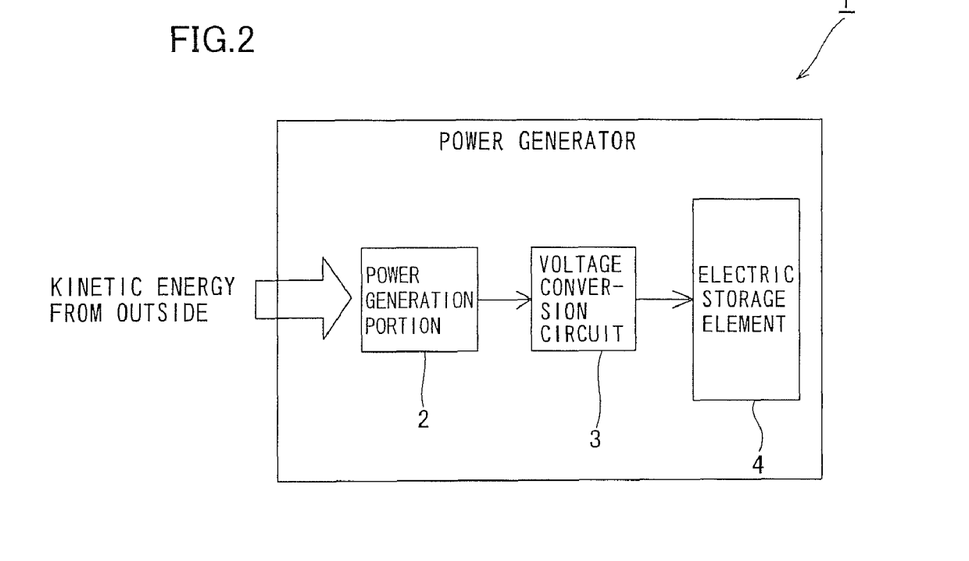
FIG. 2 is a block diagram showing the power generator according to the first embodiment of the present invention.

As shown in FIGS. 1 and 2, a power generator 1 according to a first embodiment comprises a power generation portion 2 generating power by kinetic energy provided from outside (user or person, for example) and acting on the power generator 1, a voltage conversion circuit 3 converting the electric energy generated in the power generation portion 2 to a constant voltage and an electric storage element 4 storing electric energy from the voltage conversion circuit 3. The power generation portion 2 includes a movable portion 2a linearly vibrating following displacement of the power generator 1 by the kinetic energy provided from outside and converting means (not shown) converting the kinetic energy generated by vibration of the movable portion 2a to electric energy. Specific structures of the movable portion 2a and the converting means of the power generation portion 2 will be described later.

The power generator 1 comprises a so-called eccentric rotation mechanism by a weight 5. More specifically, the sectoral weight 5 is rotatably mounted about a rotating shaft 5a. The weight 5 is so formed as to be located at the lowest point in the range of movement of the weight 5 by the own weight regardless of the direction of the power generator 1. According to the first embodiment, the power generation portion 2 is fixed to the weight 5. The movable portion 2a of the power generation portion 2 is so arranged on a central portion of the weight 5 that a vibration direction of the movable portion 2a is directed to the rotating shaft 5a (rotation center) of the weight 5. In other words, the movable portion 2a is so mounted on the weight 5 as to vibrate on a line connecting a gravity center 5b of the weight 5 and the rotating shaft 5a (rotation center) of the weight 5. Thus, the movable portion 2a is so formed as to vibrate in a direction along a direction of gravitational force (direction A) in a state where the weight 5 is located at the lowest point by the own weight. The direction of gravitational force is a direction in which acceleration is the largest when the person walks carrying the power generator 1 as described later. The weight 5 and the rotating shaft 5a are examples of the "rotating portion" and the "support mechanism" in the present invention respectively.

Figure 3:
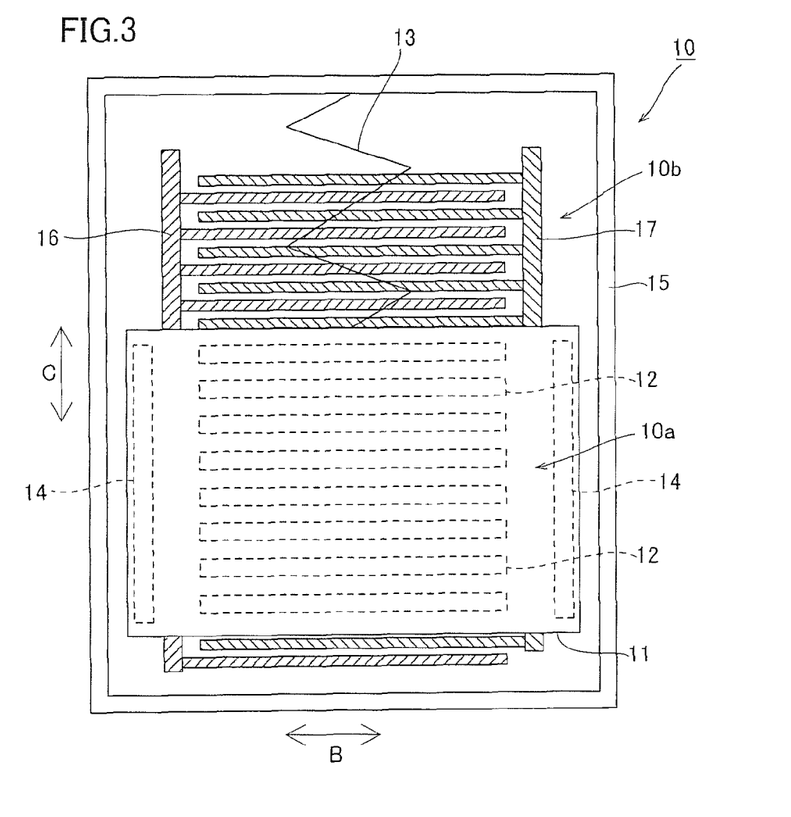
FIG. 3 is a plan view showing a power generation portion of the power generator according to the first embodiment of the present invention.
Figure 4:
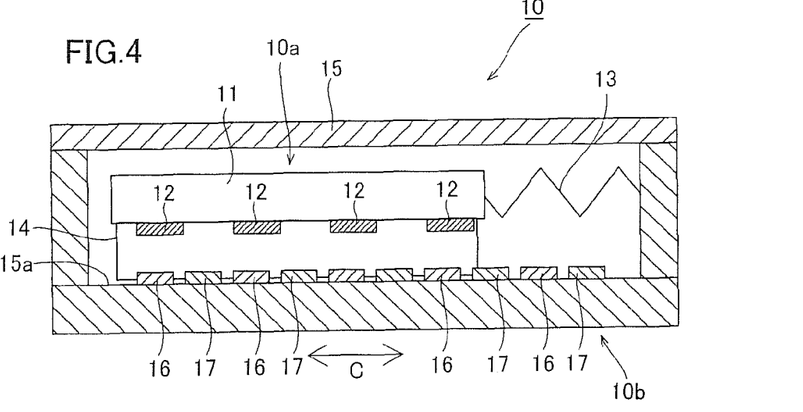
FIG. 4 is a sectional view showing the power generation portion of the power generator according to the first embodiment of the present invention.

As shown in FIGS. 3 and 4, a power generation portion 10 includes a movable portion 10a and a fixed portion 10b. The movable portion 10a includes a substrate 11, electrets 12 formed on a surface of the substrate 11 so as to extend in a direction B and semipermanently holding constant charges, a spring 13 for vibrating the substrate 11 in a direction C and spacers 14 for separating the movable portion 10a and the fixed portion 10b from each other by at least a prescribed interval. The fixed portion 10b includes a boxlike housing 15 and collectors 16 and 17 interdigitally formed on a bottom surface 15a (see FIG. 4) of the housing 15. In the power generation portion 10, the movable portion 10a including the electrets 12 vibrates in the direction C in the housing 15, so that the quantity of charges induced to the collectors 16 and 17 by electrostatic induction can be changed. Thus, a current can be generated in a circuit (not shown) connected to the movable portion 10a and the fixed portion 10b. In the power generation portion 10, the movable portion 10a vibrates following displacement of the power generation portion 10, and hence power is generated following the displacement of the power generation portion 10.

Figure 5:
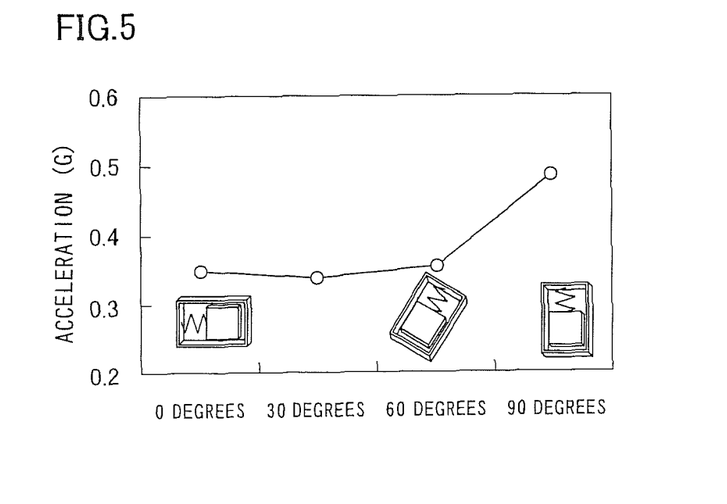
FIG. 5 is a diagram showing the measurement results of acceleration in walking by a person.

As shown in FIG. 5, it has been proved that the largest acceleration is applied in a vertical direction inclined from a horizontal direction by 90 degrees (direction of gravitational force) in walking by the person. From this, the power generation portion 2 is so arranged that the movable portion 2a vibrates in the direction of gravitational force when the person walks while carrying the power generator 1, whereby large acceleration is applied to the movable portion 2a and hence the movable portion 2a can conceivably effectively vibrate.

According to the first embodiment, as hereinabove described, the eccentric rotation mechanism changing the direction in which the movable portion 2a moves to the direction in which acceleration applied to the movable portion 2a is larger (direction of gravitational force) regardless of the direction of the power generator 1 in walking by the person is provided, whereby the direction in which the movable portion 2a vibrates can be automatically changed to the direction of gravitational force in which larger acceleration is applied to the movable portion 2a. Thus, force moving the movable portion 2a (kinetic energy) can sufficiently generated and hence power generation efficiency can be improved.

According to the first embodiment, as hereinabove described, the so-called eccentric rotation mechanism by the weight 5 rotatably supported by the rotating shaft 5a is provided and the power generation portion 2 is so fixed to the weight 5 that the movable portion 2a vibrates in the direction of gravitational force when the weight 5 is located at the lowest point, whereby the movable portion 2a can easily vibrate in the direction along the direction of gravitational force regardless of the direction of the power generator 1.

Second Embodiment

Figure 6:
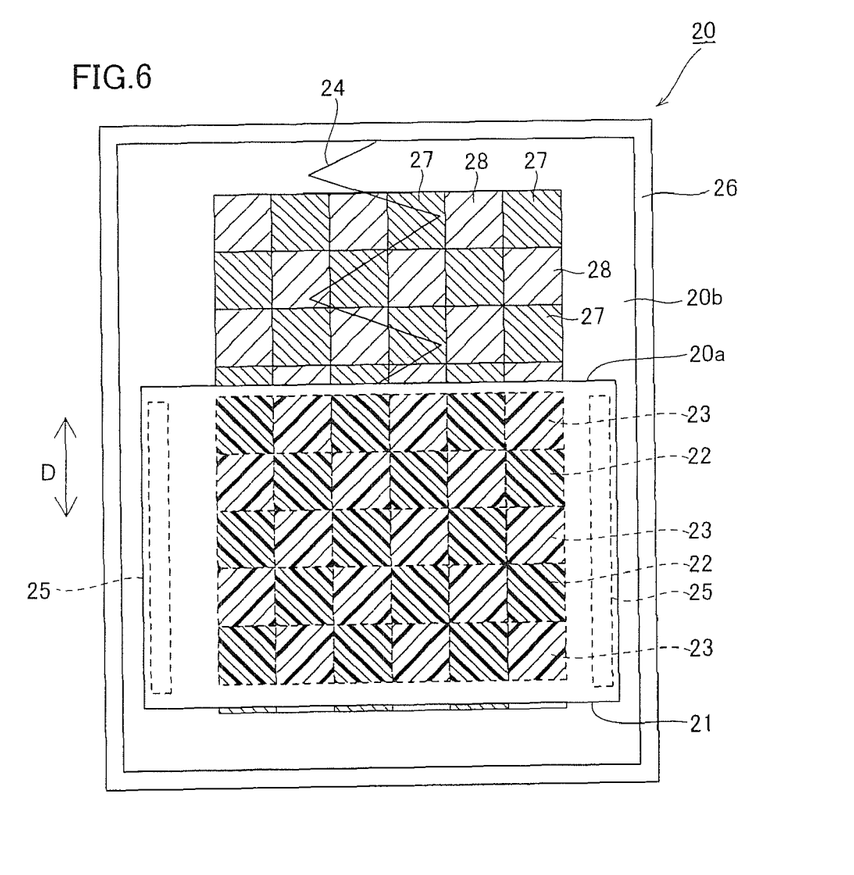
FIG. 6 is a plan view showing a power generation portion of a power generator according to a second embodiment of the present invention.
Figure 7:
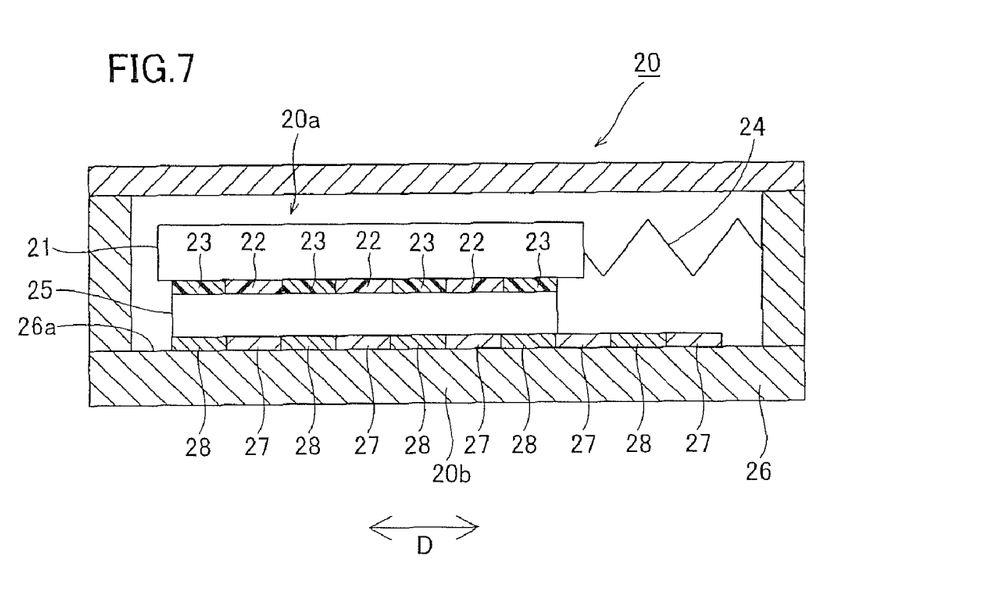
FIG. 7 is a sectional view showing the power generator portion of the power generator according to the second embodiment of the present invention.

In a power generator according to a second embodiment, power is generated by an electromagnetic induction power generation portion 20, dissimilarly to the power generator employing the electrostatic induction power generation portion 10 according to the aforementioned first embodiment.

As shown in FIGS. 6 and 7, the power generation portion 20 according to the second embodiment comprises a movable portion 20a and a fixed portion 20b. The movable portion 20a includes a substrate 21, S pole magnets 22 and N pole magnets 23 alternately arranged in the form of hound's tooth check on a surface of the substrate 21, a spring 24 for vibrating the substrate 21 in a direction D, spacers 25 for separating the movable portion 20a and the fixed portion 20b by at least a prescribed interval. The fixed portion 20b includes a boxlike housing 26 and left-handed coils 27 and right-handed coils 28 alternately arranged in the form of hound's tooth check on a surface of a bottom surface 26a (see FIG. 7) of the housing 26. In the power generation portion 20, the movable portion 20a including the S pole magnets 22 and the N pole magnets 23 vibrates in the housing 26, whereby a current can flow in the left-handed coils 27 and the right-handed coils 28 by electromagnetic induction. In the power generation portion 20, the movable portion 20a vibrates following displacement of the power generation portion 20 and hence power is generated following the displacement of the power generation portion 20.

According to the second embodiment, as hereinabove described, the electromagnetic induction power generation portion 20 generates power, whereby power can be generated corresponding to relatively large kinetic energy also by the relatively large kinetic energy by which the power generation portion 20 is largely displaced, dissimilarly to the electrostatic induction power generation portion 10 of the power generator according to the aforementioned first embodiment, and hence the quantity of power generation can be increased.

The remaining effects of the power generator according to the second embodiment are similar to those of the power generator according to the aforementioned first embodiment.

Third Embodiment

Figure 8:
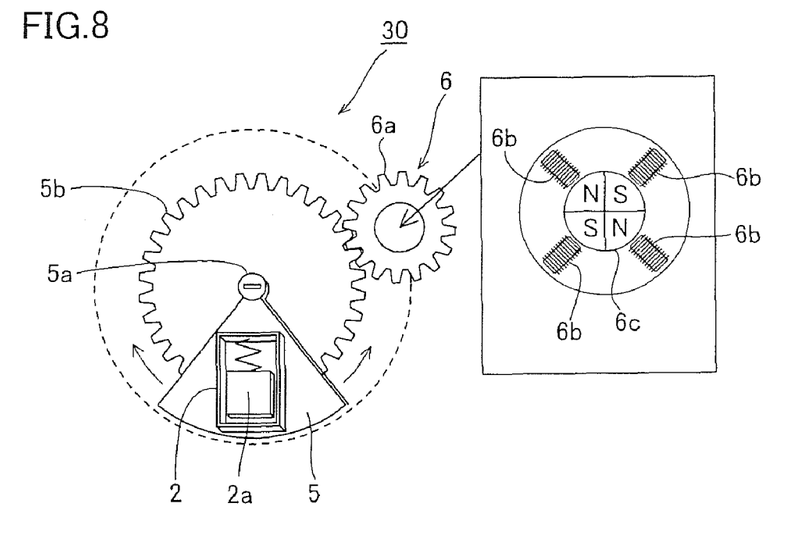
FIG. 8 is a plan view showing a power generator according to a third embodiment of the present invention.
Figure 9:
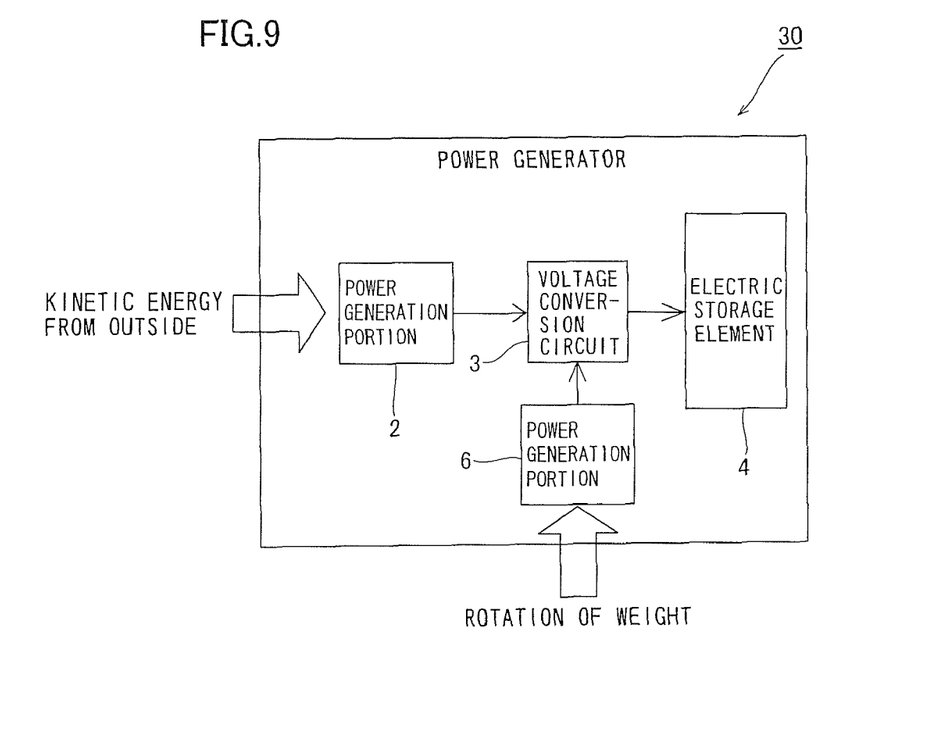
FIG. 9 is a block diagram showing the power generator according to the third embodiment of the present invention.

In a power generator 30 according to a third embodiment, power is generated by employing not only a power generation portion 2 but also kinetic energy generated by rotation of a weight 5, dissimilarly to the power generator according to the aforementioned first embodiment.

As shown in FIGS. 8 and 9, the power generator 30 according to the third embodiment comprises a so-called eccentric rotation mechanism by the power generation portion 2 and the weight 5, similarly to the aforementioned first embodiment. In this embodiment, the power generator 30 is provided with a gear 5b rotating integrally with the weight 5 about the rotating shaft 5a. In this embodiment, the power generator 30 comprises a power generation portion 6 having a gear 6a meshing with the gear 5b. The power generation portion 6 includes coils 6b fixedly arranged therein and a permanent magnet 6c composed of north and south poles rotating integrally with the gear 6a. In the power generator 30, the gear 6a and the permanent magnet 6c of the power generation portion 6 can be rotated following rotation of the gear 5b rotating integrally with the weight 5. A current due to electromagnetic induction can be generated in the coils 6b by rotation of the permanent magnet 6c. The gear ratio of the gear 6a to the gear 5b is at least 100. Thus, the rotational speed of the gear 6a can be increased even when the rotational speed of the gear 5b is small.

According to the third embodiment, as hereinabove described, the power generation portion 6 converting kinetic energy of rotating motion of the weight 5 to electric energy is provided, whereby power can be generated by not only the power generation portion 2 but also the power generation portion 6 and hence the quantity of power generation by the power generator 30 can be increased.

The remaining effects of the power generator 30 according to the third embodiment are similar to those of the power generator according to the aforementioned first embodiment.

Fourth Embodiment

Figure 10:
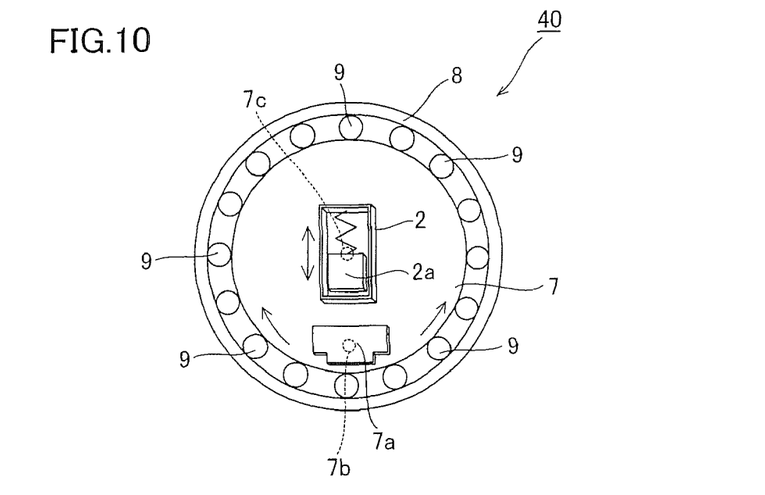
FIG. 10 is a plan view showing a power generator according to a fourth embodiment of the present invention.

In a power generator 40 according to a fourth embodiment, a power generation portion 2 is rotatably supported by bearing rotation mechanism, dissimilarly to the power generation portion of the power generator according to the aforementioned first embodiment.

As shown in FIG. 10, the power generator 40 according to the fourth embodiment includes a discoidal rotating member 7 fixed with a weight 7a and a cylindrical housing 8 having a diameter larger than the rotating member 7 and a plurality of bearing balls 9 arranged between the rotating member 7 and the housing 8 along an outer periphery of the rotating member 7. The weight 7a is so formed as to be located at the lowest point in the range of movement of the weight 7a by the own weight regardless of the direction of the power generator 40. The power generation portion 2 is fixed to the rotating member 7. The movable portion 2a of the power generation portion 2 is so arranged as to vibrate on a line connecting a gravity center 7b of the weight 7a and a rotation center 7c of the rotating member 7. Thus, the movable portion 2a is so formed as to vibrate in a direction along a direction of gravitational force in a state where the rotating member 7 is so rotated that the gravity center 7b of the weight 7a is located at the lowest point by the own weight. The remaining structure of the power generator according to the fourth embodiment is similar to that of the power generator according to the aforementioned first embodiment.

According to the fourth embodiment, as hereinabove described, the power generation portion 2 is fixed to the discoidal rotating member 7 rotatably supposed by the bearing rotation mechanism, whereby the power generation portion 2 can be rendered larger dissimilarly to the case where the power generation portion 2 is fixed to the sectoral weight 5 of the power generator according to the aforementioned first embodiment. Thus, the quantity of power generation can be increased.

The remaining effects of the power generator according to the fourth embodiment are similar to those of the power generator according to the aforementioned first embodiment.

Fifth Embodiment

Figure 11:
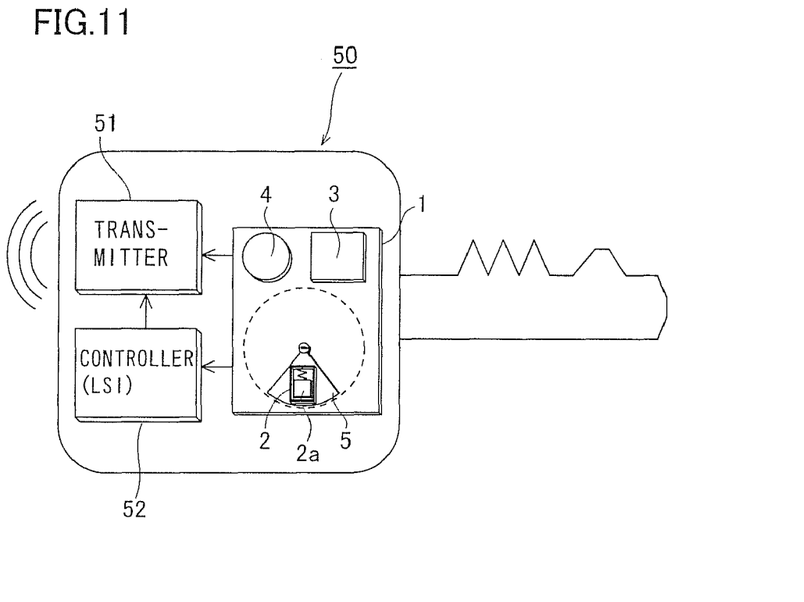
FIG. 11 is a block diagram showing an electronic apparatus (car key) according to a fifth embodiment of the present invention.

As shown in FIG. 11, a car key 50 according to a fifth embodiment comprises a power generator 1, a transmitter 51 transmitting a radio wave and a controller (LSI) 52 controlling the transmitter 51. The power generator 1 supplies power to the transmitter 51 and the controller 52.

According to the fifth embodiment, the vibration direction of the movable portion 2a of the power generator 1 is changed to the direction of gravitational force in which acceleration is the largest regardless of the direction of the car key 50 when a user carries the car key 50, and hence power generation efficiency can be improved.

Sixth Embodiment

Figure 12:
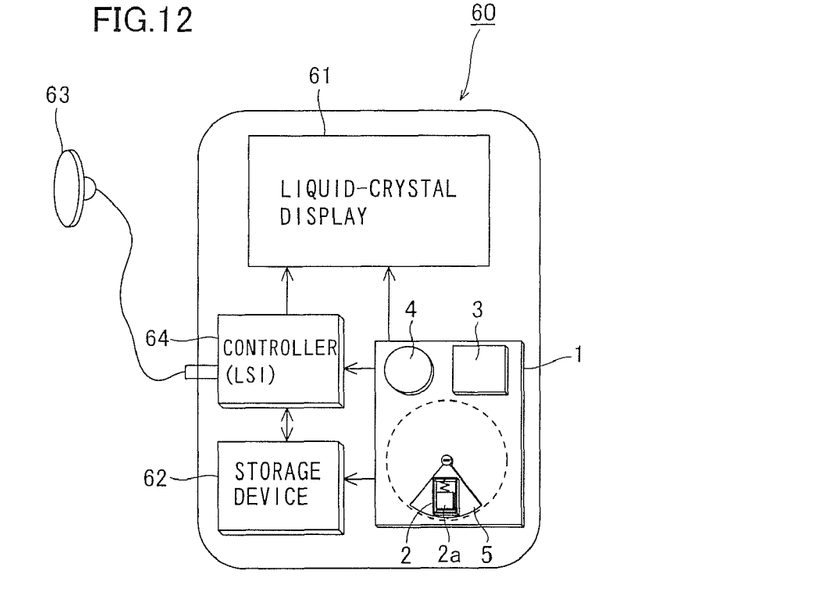
FIG. 12 is a block diagram showing an electronic apparatus (portable digital audio instrument) according to a sixth embodiment of the present invention.

As shown in FIG. 11, a portable digital audio instrument 60 according to a sixth embodiment comprises a power generator 1, a liquid-crystal display 61, a storage device 62, a speaker 63 and a controller (LSI) 64 controlling the liquid-crystal display 61, the storage device 62 and the speaker 63. The power generator 1 supplies power to the liquid-crystal display 61, the storage device 62 and the controller 64.

The remaining effects of the portable digital audio instrument according to the sixth embodiment are similar to those of the car key according to the aforementioned fifth embodiment.

Seventh Embodiment

Figure 13:
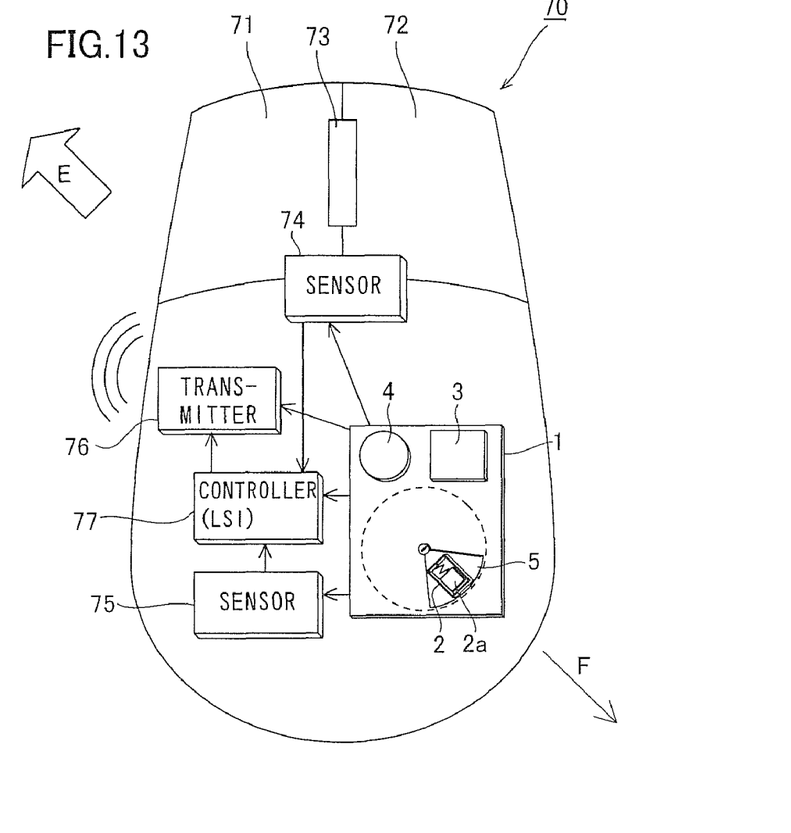
FIG. 13 is a block diagram showing an electronic apparatus (wireless mouse) according to a seventh embodiment of the present invention.

As shown in FIG. 13, a mouse 70 according to a seventh embodiment comprises a power generator 1, two buttons 71 and 72, a wheel 73, a sensor 74 detecting motion of the buttons 71 and 72 and the wheel 73, a sensor 75 detecting motion of the mouse 70, a transmitter 76 transmitting a radio wave including information on the motion of the mouse 70 and a controller (LSI) 77 controlling the transmitter 76. The power generator 1 supplies power to the sensor 74, the sensor 75, the transmitter 76 and the controller 77. According to the seventh embodiment, the power generator 1 is so arranged that a weight 5 rotates in a horizontal plane. In the mouse 70, when the mouse 70 moves, the weight 5 moves toward a direction (along arrow F) opposite to a movement direction of the mouse 70 (along arrow E) in the range of movement of the weight 5 by inertial force of the weight 5. Thus, the movable portion 2a can be vibrated along the direction for moving the mouse 70 in which acceleration is the largest.

According to the seventh embodiment, the movable portion 2a can be vibrated along the movement direction of the mouse 70 in which the largest acceleration is applied, regardless of the movement direction of the mouse 70, when a user uses the mouse 70, and hence the movable portion 2a can be more largely vibrated. Thus, the power generation efficiency of the power generator 1 can be improved.

Eighth Embodiment

Figure 14:
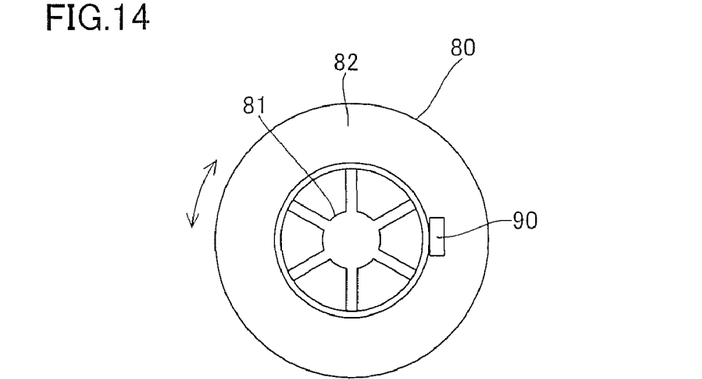
FIG. 14 is a side elevational view showing an electronic apparatus (pneumatic sensor) and a tire according to an eighth embodiment of the present invention.

As shown in FIG. 14, a tire 80 comprises a wheel 81 and a rubber tire 82. A pneumatic sensor 90 is mounted on the rubber tire 82.

Figure 15:
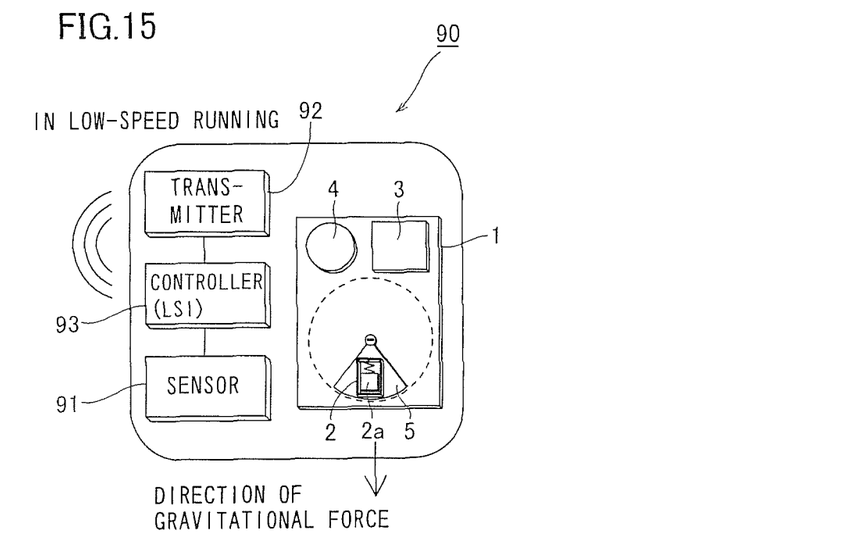
FIG. 15 is a block diagram showing the electronic apparatus (pneumatic sensor) in a low-speed running state, according to the eighth embodiment of the present invention.

As shown in FIG. 15, the pneumatic sensor 90 according to the eighth embodiment comprises a power generator 1, a sensor 91 detecting air pressure of the tire 80, a transmitter 92 transmitting a radio wave as the information of the detected air pressure and a controller (LSI) 93 controlling the transmitter 92. According to the eighth embodiment, the power generator 1 is so arranged that the weight 5 rotates in a plane parallel to a plane of rotation of the tire 80.

As shown in FIG. 15, centrifugal force applied to the weight 5 by rotation of the tire 80 is larger than gravitational force of the weight 5 in low-speed running, and hence the weight 5 moves to the lowest point in the range of the movement of the weight 5 and the movable portion 2a vibrates in a direction of gravitational force. In the low-speed running, large acceleration is applied in the direction of gravitational force following up-and-down motion of the tire 80 caused by irregularities on a road surface or the like. Therefore, in the low-speed running, the movable portion 2a can be effectively vibrated by acceleration in the direction of gravitational force resulting from the irregularities on the road surface or the like.

Figure 16:
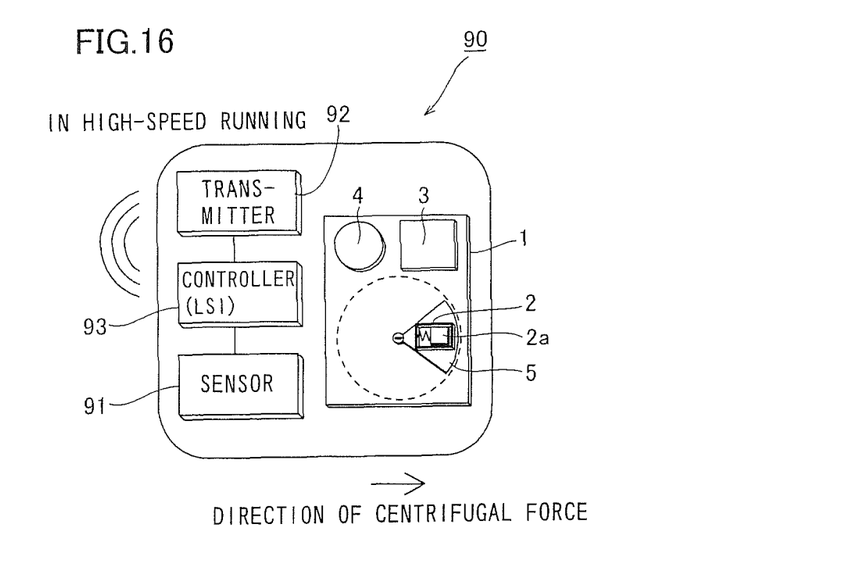
FIG. 16 is a block diagram showing an electronic apparatus (pneumatic sensor) in a high-speed running state, according to the eighth embodiment of the present invention.

As shown in FIG. 16, in high-speed running, the centrifugal force applied to the weight 5 by rotation of the tire 80 is larger than the gravitational force of the weight 5, and hence the weight 5 moves in a direction to which the centrifugal force is applied and the movable portion 2a also vibrates in the direction to which the centrifugal force is applied. In this case, the centrifugal force (acceleration applied to the movable portion 2a) is increased/decreased by increase/decrease of speed in running. Therefore, in high-speed running, the movable portion 2a can be effectively vibrated by increasing/decreasing the centrifugal force due to the increase/decrease of speed in running.

According to the eighth embodiment, as hereinabove described, the power generator 1 is built into the pneumatic sensor 90, whereby the movable portion 2a can be vibrated in the direction in which the acceleration is largely applied in the low-speed running and the high-speed running respectively, and hence power generation efficiency can be improved.

Although the present invention has been described and illustrated in detail, it is clearly understood that the same is by way of illustration and example only and is not to be taken by way of limitation, the spirit and scope of the present invention being limited only by the terms of the appended claims.

Figure 17:
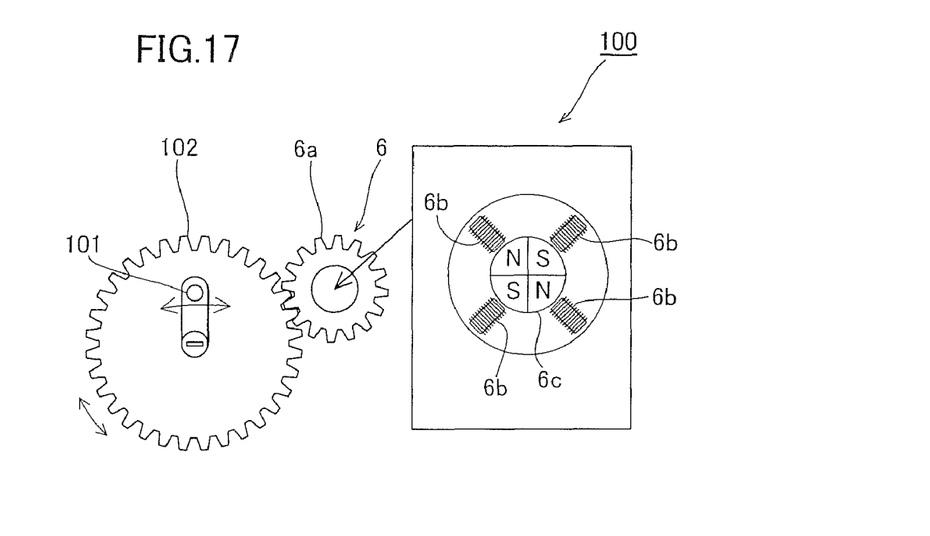
FIG. 17 is a plan view showing a power generator according to a modification of the first embodiment of the present invention.
Figure 18:
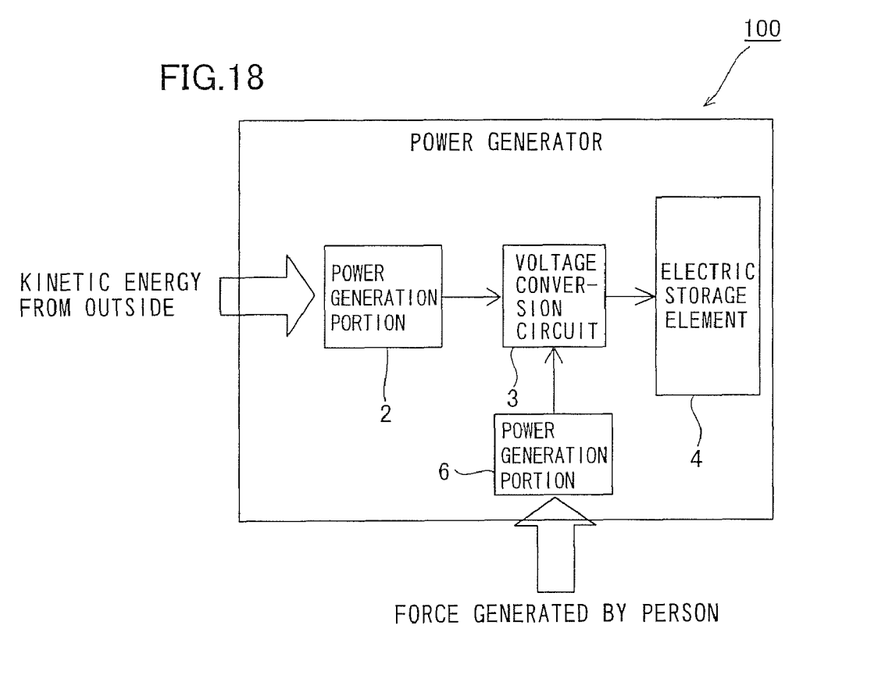
FIG. 18 is a block diagram showing the power generator according to the modification of the first embodiment of the present invention.

For example, while power is generated only by vibrating the movable portion 2a with acceleration applied to the power generator 1 in the aforementioned first embodiment, the present invention is not restricted to this but a power generator may be so formed that power can be generated by kinetic energy applied by a hand operation of a person as in a power generator 100 according to a modification shown in FIGS. 17 and 18. More specifically, the power generator 100 according to the modification of the first embodiment comprises a lever 101 rotated by the hand of a person, a gear 102 rotating integrally with the lever 101 and a power generation portion 6 according to the third embodiment having a gear 6a meshing with a gear 102, as shown in FIG. 17. The remaining structure other than the aforementioned structure is similar to that of the power generator according to the aforementioned third embodiment. In the power generator 100, the user manually rotates the lever 101 when power is deficient, whereby the user can manually generate power. The lever 101 is an example of the "manual power generation portion" in the present invention.

While the electrostatic induction power generation portion 10 and the electromagnetic induction power generation portion 20 are shown as specific examples of the power generation portion 2 in the aforementioned embodiments, the present invention is not restricted to this but another power generation portion such as a capacitance power generation portion or a piezoelectric power generation portion may be employed.

What is claimed is:

1. A power generator comprising: a movable portion moving by kinetic energy acting on a power generator body;
    a first conversion portion converting kinetic energy of said movable portion to electric energy;
    and a movement direction changing portion changing a direction in which said movable portion moves to a direction along a direction in which acceleration applied to said movable portion is larger, regardless of a direction of said power generator body;
    wherein said movement direction changing portion is so formed as to change said direction in which said movable portion moves to a direction along a direction of gravitational force;
    wherein said movement direction changing portion includes: a support mechanism rotatably supporting a rotating portion including said movable portion; and a weight for changing a position of said rotating portion to such a position that said movable portion moves in said direction along said direction of gravitational force.

2. The power generator according to claim 1, wherein said movable portion is so mounted on said rotating portion as to move on a line connecting a gravity center of said weight and a rotation center of said rotating portion.

3. The power generator according to claim 1, further comprising a second conversion portion converting kinetic energy of rotational motion of said rotating portion to electric energy.

4. The power generator according to claim 1, further comprising:
    a manual power generation portion operated by a user in order to generate power; and
    a third conversion portion converting kinetic energy provided by operation of said manual power generation portion by user to electric energy.

5. The power generator according to claim 1, further comprising a fixed portion movably holding said movable portion, wherein
    either one of said movable portion or said fixed portion includes an electlet,
    either the other of said movable portion or said fixed portion includes a collector, and
    said first conversion portion is so formed as to extract change of charges electrostatically induced in said collector due to relative movement of said electlet to said collector as the electric energy.

6. The power generator according to claim 1, further comprising a fixed portion movably holding said movable portion, wherein
    either one of said movable portion or said fixed portion includes a magnet,
    either the other of said movable portion or said fixed portion includes a coil, and
    said first conversion portion is so formed as to extract electric energy generated by electromagnetic induction in said coil due to relative movement of said magnet to said coil.

7. The power generator according to claim 1, wherein
    said movable portion is so formed as to be vibrated by kinetic energy acting on said power generator body.

8. An electronic apparatus comprising a power generator including a movable portion moving by kinetic energy acting on a power generator body,
    a first conversion portion converting kinetic energy of said movable portion to electric energy and a movement direction changing portion changing a direction in which said movable portion moves to a direction along a direction in which acceleration applied to said movable portion is larger regardless of a direction of said power i0 generator body;

wherein said movement direction changing portion is so formed as to change said direction in which said movable portion moves to a direction along a direction of gravitational force;

wherein said movement direction changing portion includes: a support mechanism rotatably supporting a rotating portion including said movable portion, and a weight for changing a position of said rotating portion to such a position that said movable portion moves in said direction along said direction of gravitational force.

9. The electronic apparatus according to claim 8, wherein said movable portion is so mounted on said rotating portion as to move on a line connecting a gravity center of said weight and a rotation center of said rotating portion.

10. The electronic apparatus according to claim 8, further comprising a second conversion portion converting kinetic energy of rotational motion of said rotating portion to electric energy.

11. The electronic apparatus according to claim 8, wherein said electronic apparatus includes a portable electronic apparatus carried by a person, and said first conversion portion is so formed as to convert kinetic energy of said movable portion moving in said direction along said direction of gravitational force by kinetic energy generated when the person carries said electronic apparatus to the electric energy.

12. The electronic apparatus according to claim 8, further comprising:
a manual power generation portion operated by a user in order to generate power; and
a third conversion portion converting kinetic energy provided by operation of said manual power generation portion by user to electric energy.

13. The electronic apparatus according to claim 8, further comprising a fixed portion movably holding said movable portion, wherein
either one of said movable portion or said fixed portion includes an electlet,
either the other of said movable portion or said fixed portion includes a collector, and
said first conversion portion is so formed as to extract change of charges electrostatically induced in said collector due to relative movement of said electlet to said collector as the electric energy.

14. The electronic apparatus according to claim 8, further comprising a fixed portion movably holding said movable portion, wherein
either one of said movable portion or said fixed portion includes a magnet,
either the other of said movable portion or said fixed portion includes a coil, and
said first conversion portion is so formed as to extract electric energy generated by electromagnetic induction in said coil due to relative movement of said magnet to said coil.

15. The electronic apparatus according to claim 8, wherein said movable portion is so formed as to be vibrated by kinetic energy acting on said power generator body.

16. The electronic apparatus according to claim 8, wherein said electronic apparatus includes an electronic apparatus employed by moving in a horizontal plane, and
said first conversion portion is so formed as to convert kinetic energy of said movable portion moving in a direction along a direction in which said electronic apparatus moves to the electric energy.

* * * * *